US010942138B2

United States Patent
Engel et al.

(10) Patent No.: US 10,942,138 B2
(45) Date of Patent: Mar. 9, 2021

(54) HIGH-PRECISION METHOD FOR DETERMINING THERMAL EXPANSION

(71) Applicant: SCHOTT AG, Mainz (DE)

(72) Inventors: Axel Engel, Ingelheim (DE); Clemens Kunisch, Armsheim (DE); Ralf Jedamzik, Griesheim (DE); Gerhard Westenberger, Mainz (DE); Peter Fischer, Budenheim (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 15/215,292

(22) Filed: Jul. 20, 2016

(65) Prior Publication Data

US 2017/0023502 A1    Jan. 26, 2017

(30) Foreign Application Priority Data

Jul. 24, 2015  (DE) .................. 10 2015 112 150
Aug. 17, 2015  (DE) .................. 10 2015 113 548

(51) Int. Cl.
*G01N 25/16* (2006.01)
*G01B 11/16* (2006.01)
*G01B 9/02* (2006.01)

(52) U.S. Cl.
CPC .......... *G01N 25/16* (2013.01); *G01B 9/02* (2013.01); *G01B 11/161* (2013.01); *G01N 2203/0057* (2013.01)

(58) Field of Classification Search
CPC ........ G01N 25/16; G01N 2203/0057; G01B 11/161; G01B 9/02
USPC .................................................. 374/56, 55
See application file for complete search history.

(56) References Cited

U.S. PATENT DOCUMENTS

| | | | | |
|---|---|---|---|---|
| 3,680,357 | A | * | 8/1972 | Clusener .............. G01B 7/24 336/136 |
| 3,805,589 | A | * | 4/1974 | Clusener ............. G01N 25/16 374/56 |
| 3,898,836 | A | | 8/1975 | Clusener |
| 3,919,879 | A | * | 11/1975 | Betz ................... G01D 5/2216 336/30 |
| 4,351,615 | A | * | 9/1982 | Vettori de Almeida Rodrigues ........... G01N 25/16 374/56 |

(Continued)

FOREIGN PATENT DOCUMENTS

| | | |
|---|---|---|
| DE | 255060 | 3/1988 |
| DE | 3714988 A1 | 11/1988 |

(Continued)

OTHER PUBLICATIONS

M+W Group. "The Next Generation of FAB Cleanroom Design"—SEMICON Russia 2015—TechLounge. Jun. 16, 2015. <http://www.semiconrussia.org/en/sites/semiconrussia.org/files/docs/Simon_Presentation_2015_EN.pdf> (Year: 2015).*

(Continued)

*Primary Examiner* — Jonathan M Dunlap
(74) *Attorney, Agent, or Firm* — Ohlandt, Greeley, Ruggiero & Perle, L.L.P.

(57) ABSTRACT

A method is provided for determining the thermal expansion of a low thermal expansion material with very high accuracy of at most +/−3 ppb/K or less and/or with a reproducibility of at most +/−1 ppb/K or less. A measuring device is also provided that includes an advanced push rod dilatometer.

45 Claims, 6 Drawing Sheets

(56) References Cited

U.S. PATENT DOCUMENTS

| | | | | |
|---|---|---|---|---|
| 4,548,515 | A * | 10/1985 | Clusener | G01N 25/16 336/136 |
| 4,618,274 | A * | 10/1986 | Clusener | G01N 25/16 374/208 |
| 4,636,090 | A * | 1/1987 | Baricevac | G01N 25/16 374/208 |
| 4,762,424 | A * | 8/1988 | Baricevac | G01N 25/16 374/208 |
| 5,121,987 | A | 6/1992 | Berg | |
| 5,287,749 | A * | 2/1994 | Nakamura | G01N 3/38 73/808 |
| 6,724,488 | B1 * | 4/2004 | Guilmette | G01B 9/02076 356/498 |
| 7,239,397 | B2 * | 7/2007 | Badami | G01B 11/161 356/485 |
| 7,350,715 | B2 * | 4/2008 | Pradhan | G06K 17/00 235/492 |
| 7,999,912 | B2 * | 8/2011 | Van Der Pasch | G03F 7/70775 355/53 |
| 10,209,048 | B2 * | 2/2019 | Lei | G01B 5/0014 |
| 2002/0041380 | A1 * | 4/2002 | Kwan | G03F 7/70775 356/616 |
| 2004/0234870 | A1 | 11/2004 | Aschke et al. | |
| 2005/0123020 | A1 * | 6/2005 | Nakamura | G01N 5/04 374/14 |
| 2006/0208098 | A1 * | 9/2006 | Shdaimah | G01N 5/025 236/44 C |
| 2007/0193742 | A1 * | 8/2007 | Robertson | E21B 41/0064 166/252.1 |
| 2008/0165345 | A1 * | 7/2008 | Hill | G01D 5/266 356/72 |
| 2008/0262391 | A1 * | 10/2008 | Ottensmeyer | A61B 1/2673 600/587 |
| 2015/0233775 | A1 * | 8/2015 | Wohlfahrt | G01N 19/00 73/862.621 |
| 2017/0153102 | A1 * | 6/2017 | Lei | G01B 5/0014 |
| 2017/0328848 | A1 * | 11/2017 | Duran | G03F 7/70958 |

FOREIGN PATENT DOCUMENTS

| | | |
|---|---|---|
| DE | 10317792 | 11/2004 |
| DE | 102012110177 | 4/2014 |
| JP | H03154856 | 7/1991 |
| JP | 2007040715 | 2/2007 |
| WO | 2014064189 | 5/2014 |

OTHER PUBLICATIONS

Dudik et al. "Precision Cryogenic Dilatometer" NASA Tech Briefs, Nov. 2005. <https://ntrs.nasa.gov/archive/nasa/casi.ntrs.nasa.gov/20110016379.pdf> (Year: 2005).*

Smith et al. "The Role of Nanometer-level Accuracy and Precision in Nanomanufacturing", First International Symposium on Nanomanufacturing, Apr. 24, 2003. <http://web.mit.edu/nanosymposium/www/Presentations/Smith.pdf> <http://web.mit.edu/nanosymposium/www/> (Year: 2003).*

Jedamzik "Modelling of the thermal expansion behavior of ZERODUR® at arbitrary temperature profiles", Proc. SPIE, vol. 7739, (2010), 12 pages.

Jedamzik, "ZERODUR: progress in CTE characterization", Proc. SPIE., vol. 8860, (2013), 11 pages.

Jedamzik, "Homogeneity of the linear thermal expansion coefficient of ZERODUR® measured with improved accuracy", Proc. SPIE, vol. 6273, (2006), 12 pages.

Schödel, "A new ultra precision interferometer for absolute length measurements down to cryogenic temperatures", Meas. Sci. Technol. 23, (2012), 20 pages.

Plummer, "Precision Thermal Expansion Measurements on Low Expansion Optical Materials", Applied Optics, vol. 7, No. 5, (1968), 8 pages.

Jedamzik, "CTE characterisation of ZERODUR® for the ELT century", Proc. SPIE, vol. 7425, (2009), 11 pages.

Westerhoff, "Progress in 4m class ZERODUR® mirror production", Proc. SPIE., vol. 8126, (2011), 10 pages.

Jedamzik, "Glass ceramic ZERODUR enabling nanometer precision", Proc. SPIE, vol. 9052, (2014), 10 pages.

English translation of Dilatometry 402 Expedis Select/Supreme, available from Netzsch, 22 pages.

* cited by examiner

HIGH-PRECISION METHOD FOR DETERMINING THERMAL EXPANSION

CROSS REFERENCE TO RELATED APPLICATIONS

This application claims benefit under 35 U.S.C. § 119(a) of German Patent Application No. 10 2015 112 150.6 filed Jul. 24, 2015 and German Patent Application No. 10 2015 113 548.5 filed Aug. 17, 2015, the entire contents of both of which are incorporated herein by reference.

BACKGROUND

1. Field of the Invention

The present invention relates to a highly accurate method for determining the thermal expansion of low-expansion materials that exhibiting low thermal expansion, such as the material Zerodur®.

2. Description of the Related Art

In the recent years, the ever tighter tolerance for the coefficient of thermal expansion (CTE) of IC lithography component materials is requesting significant progress in the metrology accuracy to determine this property as requested. The material ZERODUR®, available from SCHOTT AG, Mainz, is known for its extremely low CTE between 0° C. and 50° C. The thermal expansion coefficient is usually measured using dedicated push rod dilatometer measurement systems. In recent years, measurements using these systems have been published showing the excellent CTE homogeneity of ZERODUR® in the one-digit ppb/K range.

The verifiable homogeneity was limited by CTE (0° C., 50° C.) measurement repeatability in a range of ±1.2 ppb/K of the current improved push rod dilatometer configuration that uses an optical interferometer instead of an inductive coil. With the material ZERODUR® TAILORED, a low thermal expansion material grade was introduced, which can be adapted to individual customer application temperature profiles.

The basis for this product is a model that has been developed for better understanding the thermal expansion behavior of a material under given temperature versus time conditions. The CTE behavior predicted by the model has proven to be in very good alignment with the data determined in the thermal expansion measurements. The measurements for determining the data feeding the model require a dilatometer configuration with excellent stability and accuracy for long measurement times of several days.

In the past few years much effort was spent to drive a dilatometer measurement technology based on the push rod configuration to its limit, to meet the continuously increasing demand for higher CTE accuracy and deeper knowledge of low thermal expansion materials such as ZERODUR®.

The coefficient of thermal expansion is the most important property of low thermal expansion materials such as glass ceramics, for example ZERODUR®. The material ZERODUR® is an inorganic, non-porous lithium aluminum silicon oxide glass ceramic which is distinguished by evenly distributed nanocrystals within a residual glass matrix. The glass matrix has a positive thermal expansion coefficient of about 3 ppm/K. The crystalline phase has a negative thermal expansion coefficient. The proper adjustment of volume content and crystal size in composition and ceramization leads to the desired almost zero thermal expansion behavior at room temperature.

Generally, the thermal expansion of a low-expansion material such as ZERODUR® is defined by the CTE between 0° C. and 50° C. This CTE (0° C., 50° C.) is derived from measurements of thermal expansion at 0° C. and at 50° C. after keeping the temperature constant for 20 minutes at each temperature. In between the sample is cooled down with a rate of 36 K/h. Hence, the CTE (0° C., 50° C.) is a mean value for the temperature range from 0° C. to 50° C. Thermal expansion in the temperature range from 0° C. to 50° C. is non-linear; it is a function of temperature and time.

Many applications, for example in lithography, use low-expansion materials such as ZERODUR® in small temperature ranges around 20° C. or 22° C. Astronomical telescopes use the material at lower temperatures between −10° C. and +20° C., corresponding to the climate conditions on a mountain top. Other applications are targeting for temperatures in the range between 40° C. and 60° C.

For this purpose, a model was established to predict the material behavior under various temperature conditions. This model has been published in R. Jedamzik, T. Johansson, T. Westerhoff: "Modelling of the thermal expansion behavior of ZERODUR® at arbitrary temperature profiles", Proc. SPIE Vol. 7739 (2010); R. Jedamzik, C. Kunisch, T. Westerhoff, "ZERODUR: progress in CTE characterization", Proc. SPIE. Vol. 8860 (2013)).

The product based on this modelling approach is called ZERODUR® TAILORED. Nevertheless, it is also important to have a measurement system that is able to characterize low-expansion material in a flexible way with high accuracy and under various temperature conditions. Thermal expansion is measured using dilatometer configurations that are based on conventional push rod dilatometer concepts but are driven to high accuracy by constructional changes. These changes reflect the need to measure very small changes in length over different temperature ranges and time.

Originally, measurements were performed with conventional inductive coil push rod dilatometers with an accuracy of ±10 ppb/K and a reproducibility of ±5 ppb/K. An improved dilatometer configuration that uses an interferometric measuring head for position measurement resulted in an absolute accuracy of ±6.2 ppb/K and a repeatability of ±1.2 ppb/K, as disclosed in R. Jedamzik, R. Müller, P. Hartmann, "Homogeneity of the linear thermal expansion coefficient of ZERODUR® measured with improved accuracy", Proc. SPIE Vol. 6273 (2006).

All push rod dilatometers are regularly calibrated with reference samples by measurements conducted at Physikalisch Technische Bundesanstalt (PTB), the German counterpart of the National Institute of Standards and Technology (NIST) in the United States.

SUMMARY

Starting from the improved dilatometer configuration, an object for a measuring device, in particular for an advanced push rod dilatometer is to achieve an improved absolute CTE measurement accuracy of <±3 ppb/K together with a reproducibility of <±1 ppb/K.

In order to meet the high requirements on accuracy and reproducibility, the measuring device must exhibit very good long-term stability (no or a controllable creeping of the measuring device in the nm range over long periods). At the same time the measuring device should be robust and allow for adequate throughput in a production laboratory environment. Furthermore, a key goal is to determine the limits of the push rod dilatometer concept for the CTE measurement of low thermal expansion materials, such as Zerodur®.

This advanced push rod dilatometer is then used to perform a homogeneity measurement, in particular a homogeneity measurement of the material Zerodur®.

In the literature various different dilatometer concepts are known. Their use depends on the application and the required accuracy. For small and very thin samples capacitance dilatometers are often used. The sample is placed between the parallel plates of a capacitor. The change in length changes the distance of the movable plates and therefore the capacitance. The achievable thermal expansion accuracy depends on the thermal expansion of the cell material and the change of capacitance of the empty dilatometer cell (empty cell effect). This influence can be reduced by using fused silica as a cell material.

The Physikalisch Technische Bundesanstalt utilizes an Ultra Precision Interferometer for highly precise absolute length measurement of prismatic bodies. The samples are polished at the ends and wrung to a larger polished platen. The interferometer utilizes three stabilized lasers at 780 nm, 633 nm and 532 nm enabling high absolute length measurement accuracy in a tightly temperature controlled environment. Between 10° C. and 50° C., this configuration achieves a length measurement uncertainty of 0.22 nm, as shown in R. Schödel, A. Walkov, M. Zenker, G. Bartl, R. Meeβ, D. Hagedorn, C. Gaiser, G. Thummes, and S. Heltzel, "A new ultra precision interferometer for absolute length measurements down to cryogenic temperatures", Meas. Sci. Technol. 23 (2012).

In an industrial laboratory environment, the capacitance and the interferometric dilatometry seem to have disadvantages in terms of long and complex sample and measurement preparation. Ideally, the thermal expansion measurements should be finished in a few hours of measurement time to enable short feedback times.

Therefore, the push rod dilatometer design is the commercially most common configuration for thermal expansion measurement of materials. The sample is fixed in a fork-like structure which mechanically separates the measurement head from the furnace part in which the sample needs to be placed and the temperature profile is applied. A push rod transfers the length change of the sample to the measurement head. Standard push rod dilatometers of this type are commercially available from companies like NETSCH or LINSEIS.

The DIL 402 Expedis Select/Supreme, available from NETSCH, is a horizontal push rod dilatometer that achieves ±10 ppb/K reproducibility of the CTE measurement and an absolute accuracy of ±100 ppb/K. The Laser Dilatometer L75 from company Linseis is a combination of the optical concept and the push rod dilatometer. It offers an accuracy of ±50 nm and a reproducibility of ±10 nm. For a sample having a length of 100 mm, this translates into an accuracy of ±0.5 ppm (500 ppb).

All these dilatometer types are usually designed for measuring the thermal expansion over large temperature differences, whereas for low-expansion materials such as ZERODUR® measurements are usually performed in a temperature range from 0° C. to 50° C., or from −50° C. to +100° C. as a maximum.

A maximum measurement range required for measuring the thermal expansion of materials like ZERODUR® is in the range of ±15 ppm, or 1.5 μm, and reproducibility of the length measurement should be better than 0.05 ppm in the temperature range between 0° C. and 50° C., asking for an overall improvement of the concept.

The basic configuration of the push rod dilatometer used for measuring the thermal expansion of low-expansion materials like ZERODUR® is based on the instrument presented by Plummer and Hagy, which is disclosed in W. A. Plummer, H. E. Hagy, "Precision Thermal Expansion Measurements on Low Expansion Optical Materials", Applied Optics, Vol. 7, No. 5 (1968).

A difference in the dilatometer according to the invention is that sample holder and push rod are made of a titanium silicate glass. The system is optimized for a sample length of 100 mm and a sample diameter of 6 mm. The temperature is measured using a platinum resistance thermometer (PT 100) mounted near the sample. An electro-mechanical transformer (inductive coil) or a linear variable differential transformer (LVDT) was used as a measurement head in the first configuration.

For an improved dilatometer configuration, the measurement system was replaced by an interferometric measurement system. The resolution of the interferometer measuring head is a factor of 50 better compared to the standard LVDT configuration. It also offers better reproducibility of the measurement.

For the measurement, the sample and the sample holder are immersed into a gas cooling system. A thermostat is programmed to heat and cool the gas according to a defined procedure. When the temperature is changed the sample changes its length and the rod moves a prism inside the interferometer head thereby altering the optical path length. Therefore, the dilatometer is a relative length measurement system. Absolute accuracy depends on the accuracy of a reference sample that is required to compensate for the thermal expansion of the measurement system itself. The change of optical path length and the temperature of the gas system are recorded and used for calculating the CTE (see FIG. 1).

Such a design of the head of the laser interferometer has some advantages and disadvantages. Due to the use of a pentaprism reflector on the push rod, cosine deviation is low. Optical path lengths are small but still significant to be affected by humidity and pressure of the environment. The biggest drawback is the "non-monolithic" design of the configuration. All optical components and also the frame are connected to each other by means of a low thermal expansion resin. The influence of the resin on performance is small, but it limits the ability to increase the stability and the accuracy of the system.

Therefore, the object regarding an advanced push rod dilatometer with even better accuracy is accordingly to achieve improved absolute CTE measurement accuracy of <±3 ppb/K together with a reproducibility of <±1 ppb/K.

Another object for the new dilatometer configuration is to increase long-term stability, reproducibility and measurement accuracy of the push rod dilatometer system. Maintaining the configuration of the push rod dilatometer enables faster measurement cycles and less downtime, which is required for a measurement technique for the control of production processes, compared to an exclusively non-contact optical solution that is typically available at universities or scientific organizations.

This object is achieved in a surprisingly simple way by a method and an apparatus for determining thermal expansion of a low thermal expansion material and use of this device as disclosed herein.

According to a first aspect, the invention relates to a method for determining thermal expansion of a low thermal expansion material with a measurement accuracy of at most, that is to say not worse than +/−3 ppb/K or less, and/or with a reproducibility of at most +/−1 ppb/K or less.

In a preferred embodiment, the method is characterized by a measurement accuracy of at most 1 ppb/K or less, preferably at most 0.6 ppb/K (2 Sigma, confidence level of 95%) or less. This measurement accuracy preferably applies for CTE (0° C., 50° C.).

The measurement is carried out using a push rod dilatometer. Preferably, the so-called advanced push rod dilatometer is employed.

The method furthermore comprises measuring with a repeatability of at most, that is to say not worse than +/−5 ppb/K, preferably at most +/−3 ppb/K, more preferably at most +/−1 ppb/K.

Temperature control of a sample of the low thermal expansion material is accomplished in a temperature control unit, preferably a furnace, and the sample is temperature-controlled in the temperature control unit using a gas, preferably helium.

A temperature range for the measurement can be selected from a temperature range between −50 and +100° C., for example a temperature range from 40° C. to 70° C., from −10° C. to +20° C., or from 19° C. to 24° C.

The conventional push rod dilatometer configuration has been redesigned in many aspects so as to comprise the following improved features in a configuration referred to as "advanced push rod dilatometer": The fork was redesigned to enable a monolithic design without connected or bonded parts. Implementation of a high-accuracy incremental linear encoder LIP382, available from company HEIDENHAIN. This linear encoder exploits laser diffraction read out of incremental scale periods, with a resolution better than 0.25 nm. The length change of the sample is transferred by a push rod to the measuring head. The push rod is mounted to the fork by means of springs, in particular with a newly designed low thermal expansion spring mount. The sample is cooled and heated within a furnace with He as a heat transfer medium. The furnace design is FEM optimized. Also, the location of temperature measurement has been optimized.

A cryostat was installed to achieve very reproducible temperature profiles during the measurement over the complete temperature range from −50° C. to +100° C. Reproducibility is better than 0.2° C., depending on the temperature range.

The measuring device, in particular the complete push rod dilatometer is placed in an air conditioned laboratory with a temperature variation within the measurement area of less than ±0.2° C. and stability of humidity of better than ±2%.

New titanium silicate reference samples measured at PTB (Physikalisch Technische Bundesanstalt) exhibiting a temperature dependent length accuracy between ±0.06 and ±0.003 ppm are used to guarantee highest absolute measurement accuracy.

Table 1 below summarizes the achievable accuracies of different push rod dilatometer configurations.

TABLE 1

CTE measurement: Accuracy and reproducibility of different push rod dilatometer configurations based on CTE (0° C., 50° C.) measurements.

| Push rod dilatometer | Measurement head | Accuracy, abs. | Reproducibility |
|---|---|---|---|
| Standard | Inductive coil | ±10 ppb/k | ±5 ppb/k |
| Improved | Interferometer | ±6.2 ppb/k | ±1.2 ppb/k |
| Advanced (novel) | Linear incremental encoder | <±3 ppb/K | <±1 ppb/K |

As used herein, the term CTE (0° C., 50° C.) measurements refers to measurements that are used to determine the CTE over the temperature range from 0° C. to 50° C.

According to a second aspect, the present invention accordingly provides a device for measuring the linear expansion of a low thermal expansion sample, comprising a push rod dilatometer, preferably an advanced push rod dilatometer with a push rod, a fork, and springs for holding the push rod within the fork.

The advanced push rod dilatometer is distinguished by the fact that the fork and the push rod are formed monolithically. Accordingly, each of the fork and the push rod are made of a respective single workpiece, preferably of a low-expanding material such as Zerodur® or titanium silicate, so that organic compounds such as adhesives or connecting parts made of plastics can be eliminated for connecting the elements. This is of great importance, since the different thermal expansion behavior of organic compounds or of the plastic parts on the one hand and of the material of the fork and/or the push rod on the other hand have an adverse effect on measurement accuracy.

This is particularly important when for the CTE measurements a sample of a low thermal expansion material loaded into the push rod dilatometer is subjected to the appropriate temperature, whereby portions of the measuring device or of the push rod dilatometer are also subjected to this temperature, whereas other areas are not exposed to this temperature. Therefore, generally, a lowest possible and most homogeneous possible thermal expansion of the measuring device, in particular the push rod dilatometer and its associated components is desired.

Therefore, according to the invention the spring for holding the push rod in the fork is also made of a low thermal expansion material, to not affect the expansion behavior of the device during temperature adjustment. For instance, the material Invar® may be used as a spring material.

Furthermore, in the context of the invention, a cryostat for a temperature range from −50° C. to +100° C. with a reproducibility of at least 0.5° C., more preferably at least 0.3° C., most preferably at least 0.2° C. is used, so that high-precision temperature control of the loaded sample is ensured.

For performing CTE measurements, the device is preferably operated in a climate-controlled room with a constant predetermined temperature, for example 22° C., with a maximum deviation of +/−0.2° C., and/or at a constant predetermined humidity with not more than +/−2% deviation.

In this way it is possible to obtain a device for CTE measurements that exhibits very good long-term stability, which means very low creeping, in the nm range. This creeping is preferably not more than 0.1 nm/h (1.4 nm/day), more preferably not more than 0.08 nm/h, most preferably not more than 0.06 nm/h.

After contacting a loaded sample at the predetermined temperature, the position of the push rod relative to the fork is determined by means of an optical interferometer as a detector. Here, preferably, the linear incremental encoder is used.

In a preferred embodiment, this interferometric measuring head exhibits an absolute accuracy of at least +/−10 ppb/K, preferably at least +/−8 ppb/K, more preferably +/−7 ppb/K, and/or a repeatability of not more than +/−2 ppb/K.

Finally, a third aspect of the invention relates to the use of the above-mentioned method for characterizing low thermal expansion materials or samples, in particular for measuring the thermal expansion behavior of such low thermal expansion materials or samples which are intended for use in astronomy, LCD lithography, micro-lithography, and measuring technology.

According to the invention, the advanced push rod dilatometer described above is employed for this purpose.

In this way it is possible to measure thermal expansion of substrate materials for microlithography, for example for wafer stages, and in extreme ultraviolet (EUV) lithography in particular also for substrates for mask blanks and mirrors for EUV lithography.

Preferably, the substrate materials are selected from the group consisting of ceramics, glass ceramics, and glass, for example low thermal expansion fused silica such as Ti-doped quartz glass, which is also referred to as titanium silicate or titanium silicate glass, e.g. ULE®, or low thermal expansion LAS glass ceramics, especially Zerodur®, Clearceram®, SITAL®, or generally low thermal expansion ceramics such as cordierite.

The substrate material may exhibit a zero crossing of the CTE/T curve at the application temperature, and the application temperature may be selected, for example, from 22° C., 40° C., 60° C., 70° C., or 80° C., or another value in the temperature range from 0° C. to 80° C.

BRIEF DESCRIPTION OF THE DRAWINGS

The invention will now be described in more detail by way of preferred embodiments and with reference to the accompanying figures. In the drawings.

DETAILED DESCRIPTION

In the following detailed description of preferred embodiments, similar components in or on these embodiments are designated by the same reference numerals, for the sake of clarity. However, in order to better illustrate the invention, the preferred embodiments shown in the figures are not always drawn to scale.

Figure 1:
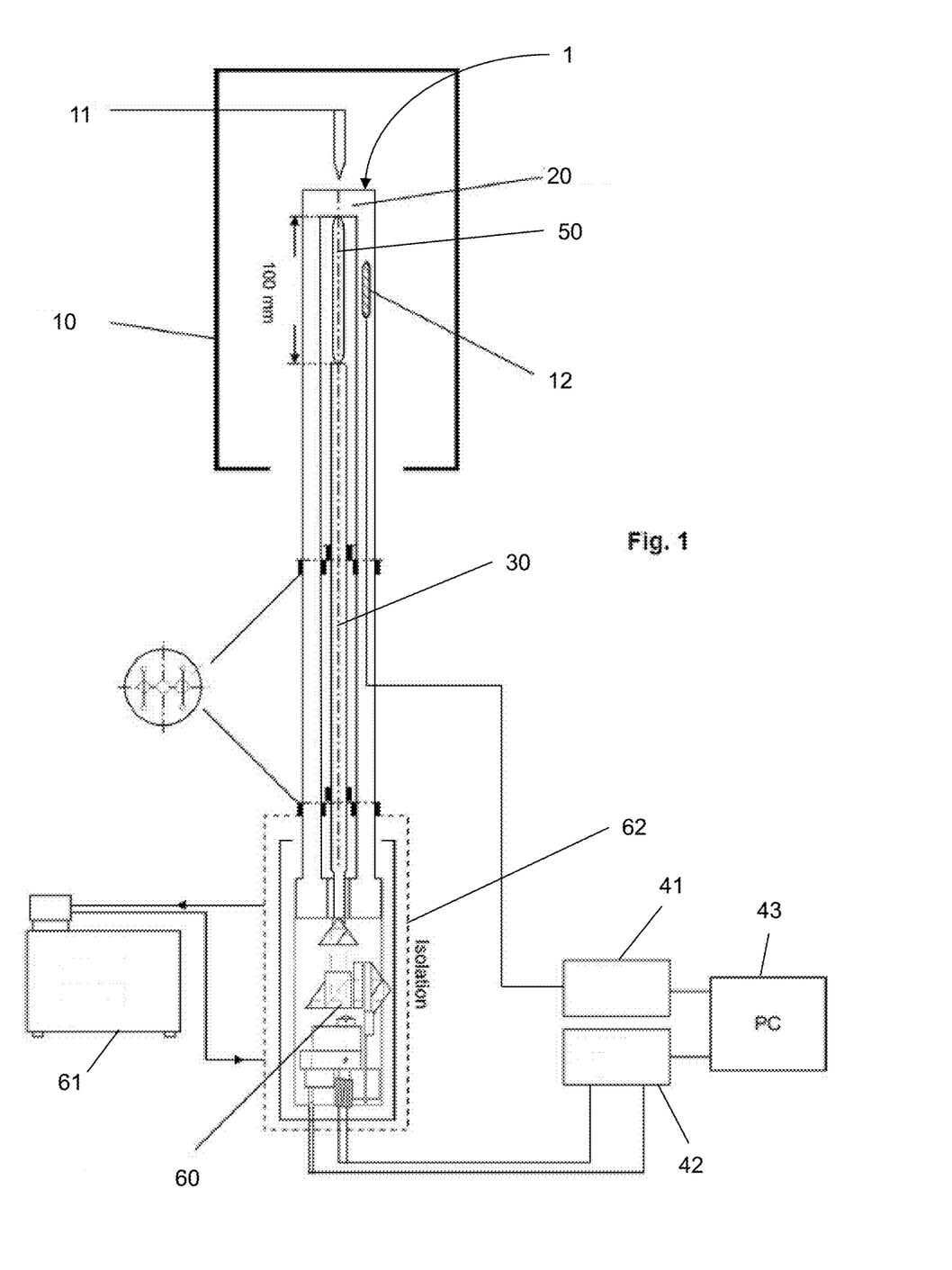
FIG. 1 shows the basic setup of the improved push rod dilatometer configuration.

FIG. 1 schematically illustrates the basic configuration of a device for measuring the thermal expansion behavior (CTE measurement) using a push rod dilatometer. Push rod dilatometer 1 comprises a fork 20 and a push rod 30. Springs for holding the push rod in the fork are not shown, for the sake of clarity.

The temperature-control device comprises a furnace 10, supply means 11 for a heat transfer medium, helium in the present example, and a temperature sensor 12, in the present example a Pt 100 platinum resistance thermometer, for temperature measurement and monitoring. Between the head end of push rod 30 and the open area of fork 20 not covered by push rod 30, a sample 50 of a low thermal expansion material is inserted, in the present example of Zerodur®, which is contacted by the head end of the push rod.

At the opposite foot end of push rod 30, a laser interferometer 60 is arranged for measuring the position the foot end of push rod 30 relative to fork 20. This measurement area is surrounded by an isolation 62, and a thermostat 61 is provided to maintain a predetermined temperature.

Thermocouple 12 is connected to a central processing unit 43 via a voltmeter 41. Furthermore, a control unit 42 is provided for controlling the measurements and storing the measured values in processing unit 43.

For performing a CTE measurement, the sample 50 to be measured is inserted into the opening of fork 20. Then, the sample is subjected to the desired temperature. Once the temperature is reached, which can be detected by thermocouple 12, the measurement of the expansion of the sample may be performed. For this purpose, the sample 50 is contacted by push rod 30, and the position of the foot end of push rod 30 relative to fork 20 is measured. The measured values are stored in processing unit 43. Then, the temperature is changed according to a predetermined temperature profile, and once the temperature has been reached the measurement is repeated.

Figure 2:
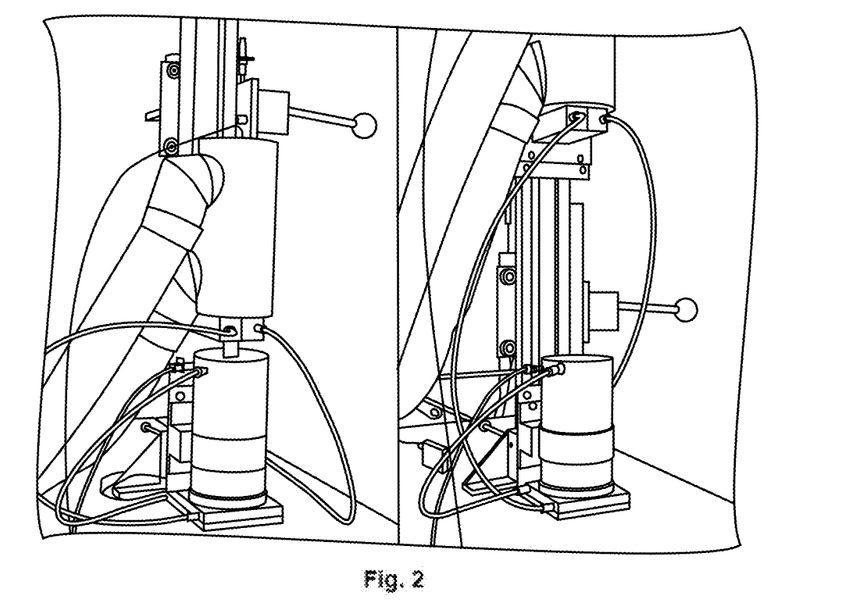
FIG. 2 shows the advanced push rod dilatometer.

The configuration of the novel, advanced push rod dilatometer is shown in FIG. 2. One key property of the new advanced push rod dilatometer is its accuracy and reproducibility for CTE (0° C., 50° C.) measurement. Absolute measurement accuracy is limited by the measurement accuracy of a reference sample of titanium silicate material, measured at PTB (Physikalisch Technische Bundesanstalt). The measurements were performed at PTB's ultra precision interferometer (UPI) the most recent state of the art, described in R. Schödel, A. Walkov, M. Zenker, G. Bartl, R. Meeβ, D. Hagedorn, C. Gaiser, G. Thummes and S. Heltzel: "A new ultra precision interferometer for absolute length measurements down to cryogenic temperatures", Meas. Sci. Technol. 23 (2012).

Three highly stabilized lasers are subsequently used in the measurements. The length values resulting from the use of the two J2-stabilized lasers at 532 nm and 633 nm were averaged. The Rb-stabilized laser at 780 nm was only used for a coincidence check. The measurements were performed under vacuum conditions. The temperature near the samples was measured using thermocouples.

Figure 3:
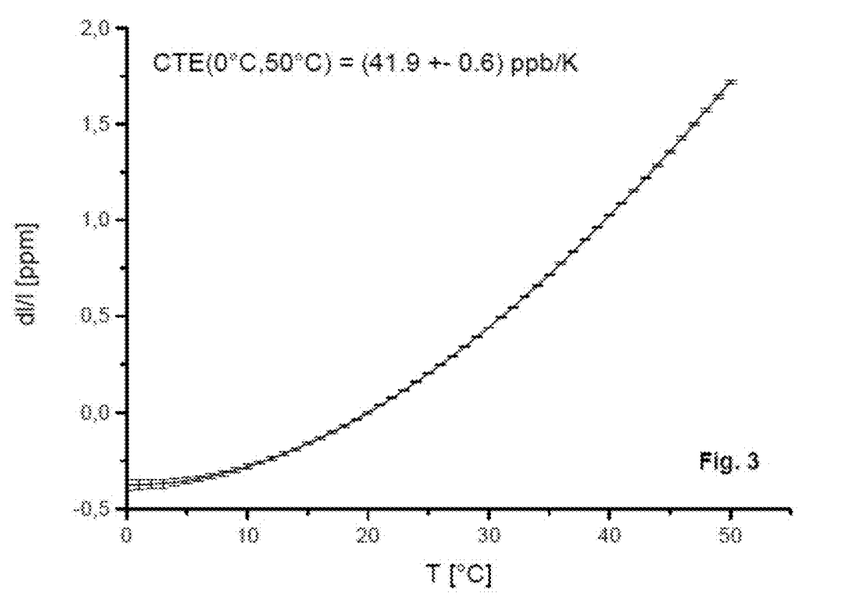
FIG. 3 shows calibration sample measurement results from PTB.

FIG. 3 shows the measurement results of a CTE measurement between 0 and 50° C. with the associated uncertainties of the length measurement. The evaluated uncertainty for the CTE (0° C., 50° C.) measurement is 0.6 ppb/K (2 Sigma, 95% confidence level). The uncertainty of the length measurement varies between ±0.003 and ±0.06 ppm depending on the temperature range. Error bars in FIG. 3 indicate the different accuracy ranges. The calibration sample enables a highly accurate correction for the inherent thermal expansion of the remaining system structure.

The advanced push rod dilatometer is optimized for better measurement stability over time. Therefore, it can be utilized for thermal expansion measurements in narrow temperature regimes over a rather long time, i.e. for temperature ranges of a width smaller than 50° C., for example for ranges of a width of not more than 20° C., preferably not more than 10° C., and according to certain embodiments of not more than 5° C.

Figure 4:
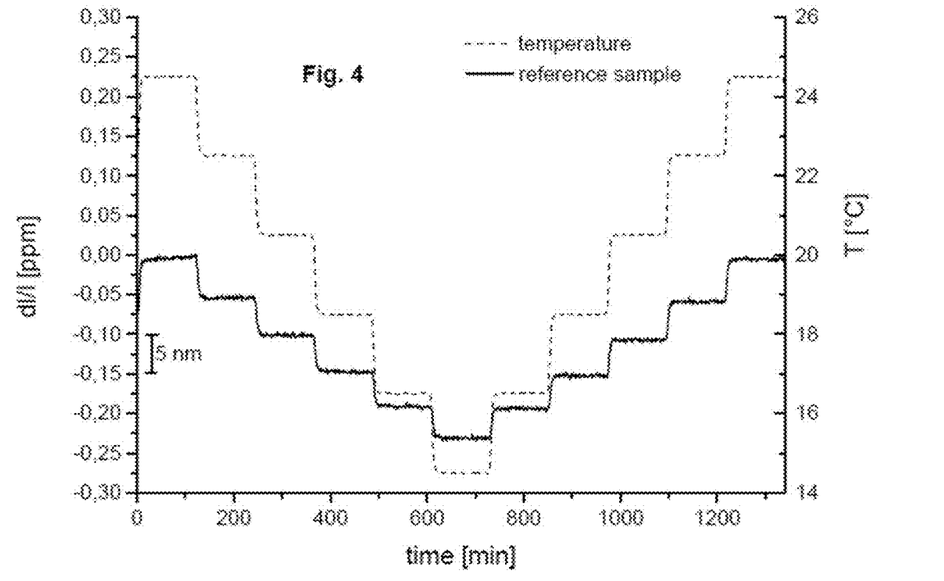
FIG. 4 illustrates a measurement of thermal expansion of a titanium silicate reference sample over a small temperature range.

FIG. 4 shows a temperature profile for a measurement of thermal expansion of a titanium silicate reference sample around 22° C. The temperature is decreased in steps of 2° C. starting from a temperature of 24.5° C. down to 14.5° C., followed by 2 hours at constant temperature. The total measurement time sums up to 23 hours. Additionally, FIG. 4 illustrates the measurement of a titanium silicate reference sample under the given temperature profile.

Due to the high resolution of the measuring head, the measurement exhibits an excellent resolution of the novel advanced push rod dilatometer with a very low noise level. For long time measurements it is important that the push rod dilatometer exhibits very low and predictable creeping. The solid line represents the reference sample, the dotted line represents temperature.

Figure 5:
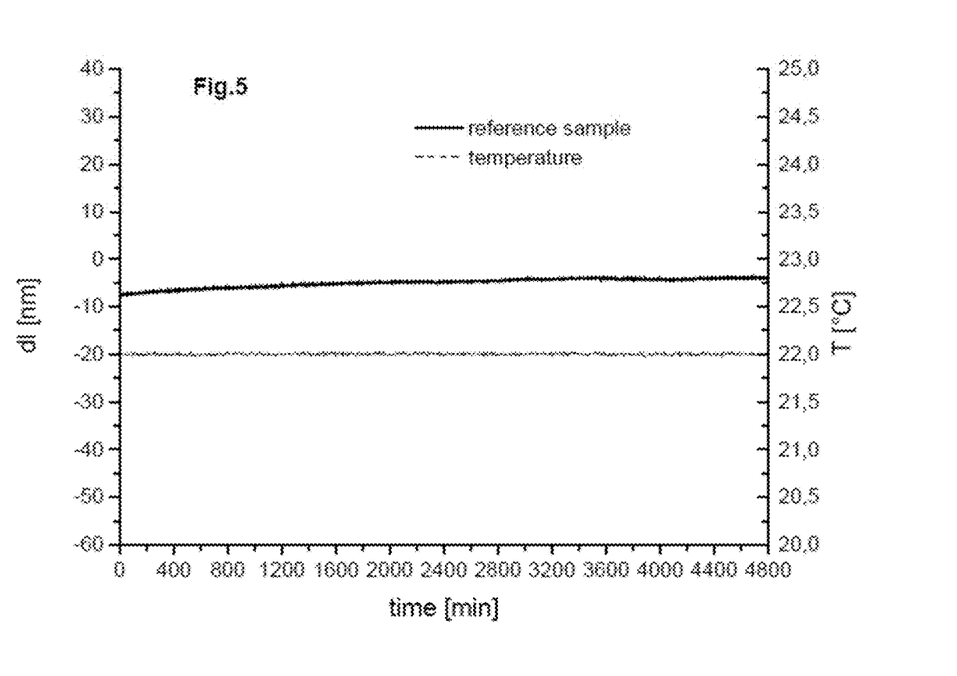
FIG. 5 illustrates a measurement of creeping.

FIG. 5 shows the drift or creeping behavior of the advanced dilatometer measured over a time period of 80 hours. The observed creeping is almost linear and very small, with only less than 0.06 nm per hour=1.44 nm per day. It is important to check if measurement repeatability varies with temperature. The solid thicker line represents the temperature, the dotted thinner line represents the reference sample.

Figure 6:
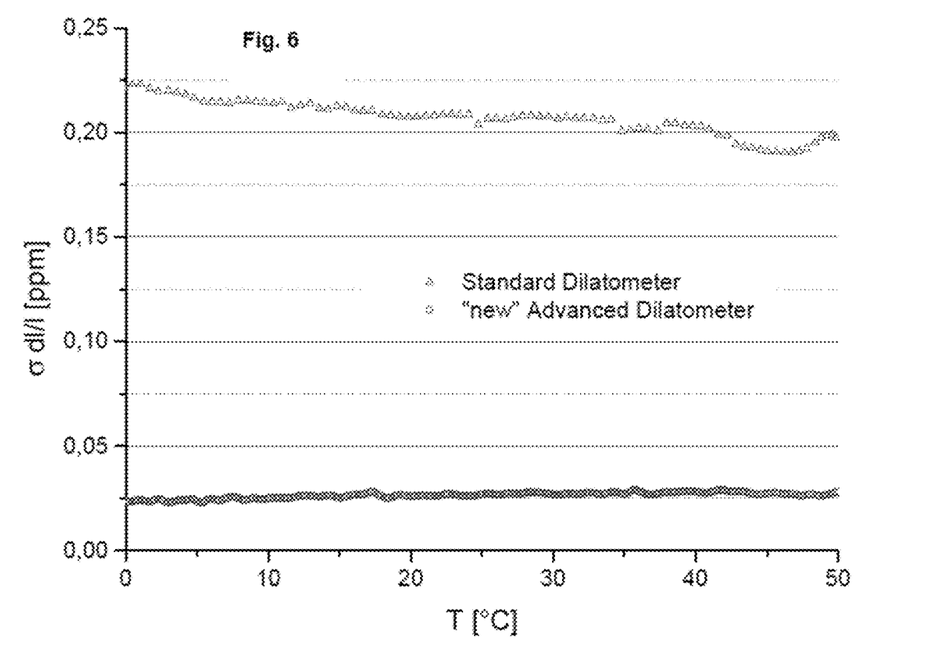
FIG. 6 shows length measurement reproducibility (sigma dill) as a function of temperature.

FIG. 6 illustrates the reproducibility of the length measurement (Sigma dl/l) as a function of temperature by way of the example of the standard push rod dilatometer (triangular marks) and of the advanced push rod dilatometer (circular marks). As can be seen as a result, the advanced push rod dilatometer exhibits an improvement by almost a factor of 10 compared to the standard push rod dilatometer.

In particular, FIG. 6 shows the variation of the standard deviation of a length measurement over a temperature range from 0° C. to 50° C. using the advanced push rod dilatometer in comparison to the variation of standard deviation of a length measurement using the standard push rod dilatometer. It can be seen that the variation of the advanced push rod dilatometer is almost constant over temperature, with a value of less than 0.03 ppm (3 nm for a sample length of 100 mm), whereas with the standard push rod dilatometer repeatability seems to decrease with temperature. The standard deviation of the standard push rod dilatometer is about a factor of 10 higher compared to the advanced push rod dilatometer.

The repeatability of the improved push rod dilatometer was shown in R. Jedamzik, R. Müller, P. Hartmann: "Homogeneity of the linear thermal expansion coefficient of ZERODUR® measured with improved accuracy", Proc. SPIE Vol. 6273 (2006), for a time period of 7 days. This is a time frame that is longer than the typical time required for a homogeneity measurement which needs about 2 to 3 days. During this time period, the push rod dilatometer needs to be as stable as possible. The standard deviation over all measurements is ±0.6 ppb/K, resulting in a short term reproducibility of ±1.2 ppb/K, based on a 95% confidence level, for the improved push rod dilatometer.

Figure 7:
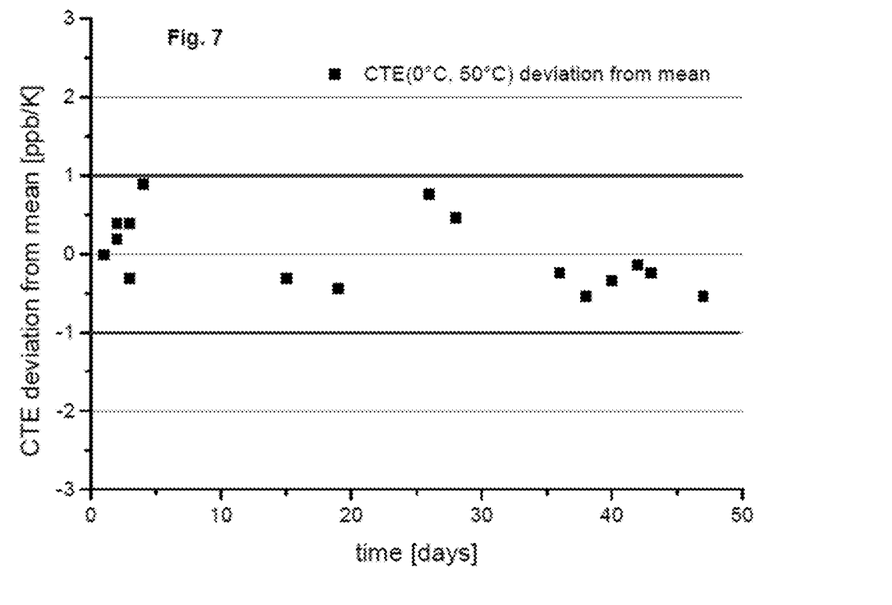
FIG. 7 illustrates reproducibility of CTE (0° C., 50° C.) measurements of the advanced dilatometer.

FIG. 7 illustrates the reproducibility of a CTE (0° C., 50° C.) measurement using the advanced push rod dilatometer. The measurement shows a repeatability of less than 1 ppb/K for a 95% confidence level within a time period of 50 days.

In particular, FIG. 7 shows the results of weekly CTE (0° C., 50° C.) measurements on the reference sample performed using the novel advanced push rod dilatometer, for a time frame of 50 days. The standard deviation is 0.47 ppm/K, and therefore the reproducibility 2*σ (95% confidence level) is better than 1 ppb/K. The measurements using the advanced push rod dilatometer already show a higher reproducibility of the measurements over a much longer time period as compared to the older improved push rod dilatometer.

With the advanced push rod dilatometer, short to mid time repeatability is better than ±1 ppb/K. The absolute measurement accuracy is excellent, due to the high quality calibration standard and the low drift tendency due to the many constructive improvements realized. Therefore, an absolute measurement accuracy of ±3 ppb/K can be achieved.

Generally, the performance of push rod dilatometers is limited by the mechanics of the structure. Nevertheless, with a purely optical contact setup higher accuracies can be realized. However, the effort to achieve the necessary stability and sample preparation time will be much higher.

R. Jedamzik, T. Döhring, T. Johansson, P. Hartmann, T. Westerhoff: "CTE characterisation of ZERODUR® for the ELT century", Proc. SPIE Vol. 7425 (2009) reported a CTE homogeneity in the single digit parts per billion (ppb) per Kelvin range for circular and rectangular blanks of the material Zerodur® with diameters in the 1.5 m range.

The term CTE homogeneity herein refers to the homogeneity of the CTE of different samples of the same material, which are therefore cut out of the same material at different positions and are analyzed. This permits to conclude on the homogeneity of the CTE of rather large bodies.

Similar results were achieved for mirror blanks with dimensions of about 4 m (so-called 4 m class) confirming the excellent CTE homogeneity on the same level as reported in T. Westerhoff, S. Gruen, R. Jedamzik, C. Klein, T. Werner, A. Werz: "Progress in 4 m class ZERODUR® mirror production", Proc. SPIE. Vol. 8126 (2011).

Figure 8:
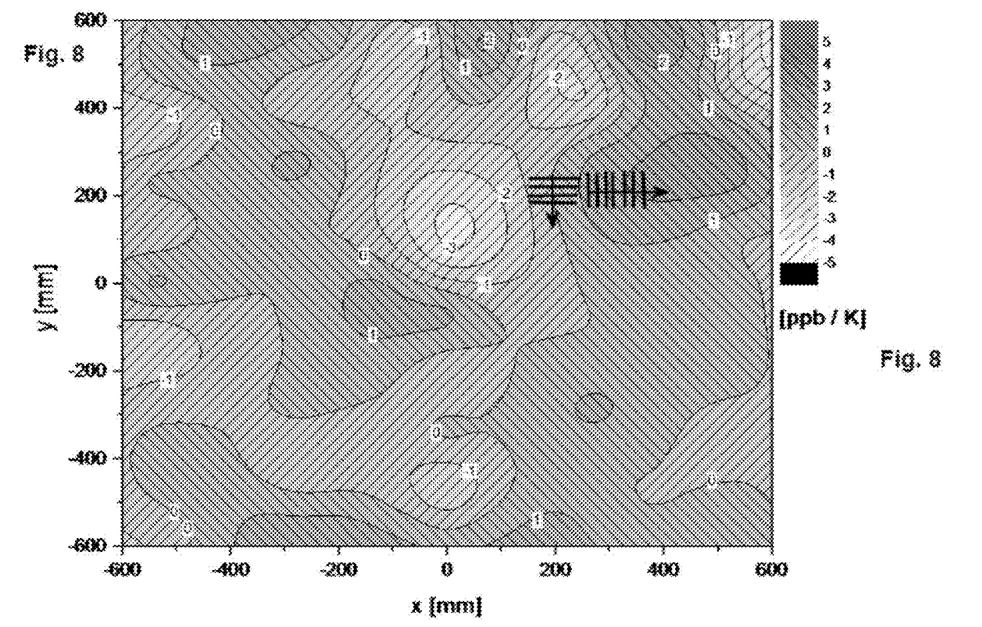
FIG. 8 is a two-dimensional contour plot of CTE homogeneity.

Measurements were also performed on smaller spatial dimensions, on a 1200 mm×1200 mm sized test plate made of the material ZERODUR®. FIG. 8 shows a two-dimensional contour plot of CTE homogeneity. A number of 64 samples were cut from this test plate evenly distributed. The spacing between these samples was approximately 100 mm. The difference of the individual measurements to the mean value of the blank is illustrated in the contour plot. The two vertical and horizontal lines in FIG. 8 indicate the position of the sample cutting with a spacing of 7.5 mm.

The CTE mean value of the blank is determined using the improved dilatometer and is 12.2 ppb/K for the blank. The total CTE homogeneity of the blank exhibits a peak-to-valley variation of 5 ppb/K. To evaluate CTE homogeneity on a spatial scale between 100 mm and 150 mm, a portion of the plate was cut into many samples located directly next to each other. The CTE sample geometry at least needed for high accuracy CTE measurement is 100 mm times 5 mm×5 mm in cross section. Due to typical losses during cutting, the minimum achievable spacing between the samples is therefore 7 to 8 mm.

On this scale, 14 samples were cut horizontally in y direction, with a total height of 110 mm. 21 samples were cut vertically in x direction, with a total width of 150 mm. The results based on the so called improved push rod dilatometer can be found in R. Jedamzik, C. Kunisch, J. Nieder, T. Westerhoff: "Glass ceramic ZERODUR enabling nanometer precision", Proc. SPIE Vol. 9052 (2014).

This measurement was repeated using the advanced push rod dilatometer configuration and the same set of samples.

Figure 9:
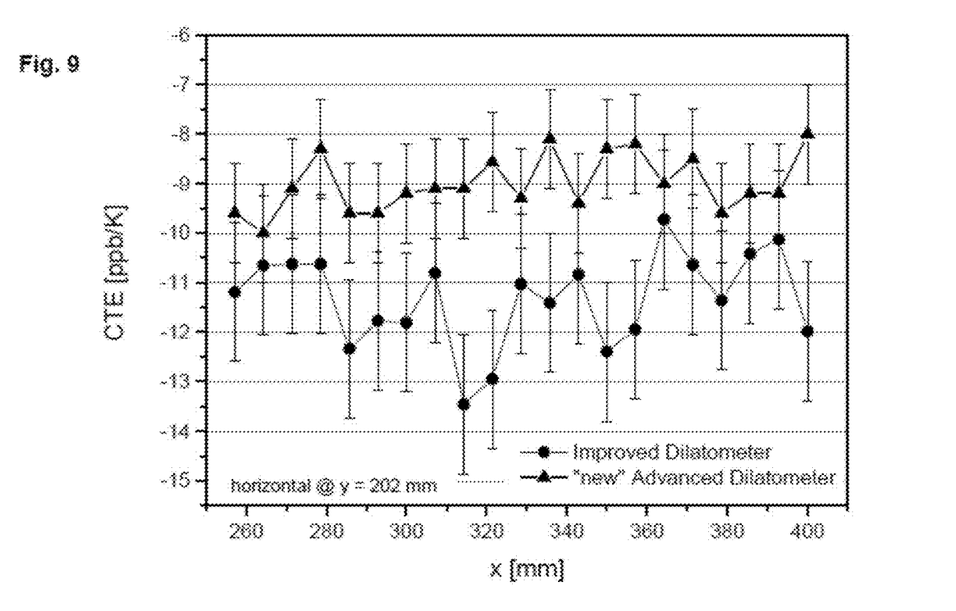
FIG. 9 illustrates CTE homogeneity of a 1200 mm×1200 mm test plate made of the material ZERODUR®, at y=202 mm in x direction.

FIG. 9 shows the CTE homogeneity results for the samples cut horizontally in y direction as measured by the improved push rod dilatometer and by the advanced push rod dilatometer, in comparison. The maximum peak-tovalley variation of homogeneity observed in the old measurement using the improved push rod dilatometer is 4 ppb/K. In the new measurement using the advanced push rod dilatometer the results are closer together, resulting in a variation of 2 ppb/K.

The mean absolute value of the measurement using the advanced push rod dilatometer is lower by about 3 ppb/K. This is still within the differences of absolute measurement accuracy of 6.2 ppb/K for the improved push rod dilatometer and of 3 ppb/K for the advanced push rod dilatometer. The error bars (±1.2 ppb/K for the improved and ±1 ppb/K for the advanced push rod dilatometer) indicate the reproducibility of the measurements. When comparing the change in the results from sample to sample between the two measurements it is difficult to find any trend. It seems that the variation purely reflects the accuracy/repeatability of the measurement. This was already postulated in R. Jedamzik, C. Kunisch, J. Nieder, T. Westerhoff: "Glass ceramic ZERODUR enabling nanometer precision", Proc. SPIE Vol. 9052 (2014), and apparently has been verified with the present comparison.

Figure 10:
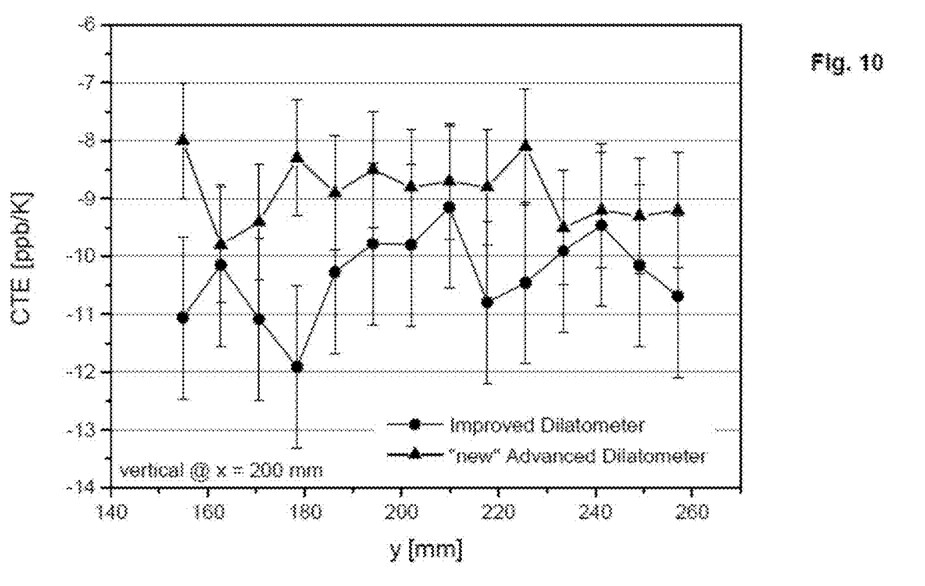
FIG. 10 illustrates CTE homogeneity of the 1200 mm×1200 mm test plate made of the material ZERODUR®, at x=200 mm in y direction.

Similar results can be found when comparing the results of the samples cut vertically, in FIG. 10. The maximum peak-to-valley variation observed with the improved push rod dilatometer is 3 ppb/K. The homogeneity observed with the novel advanced push rod dilatometer is only 2 ppb/K. The offset between the two measurements is in the range of 2 to 3 ppb/K and therefore in agreement with the observations in the horizontal measurement. Again there is no comparable trend behavior from sample to sample along the measurement locations.

Therefore, these results seem to underline that the observed variations are measurement noise and do not constitute small scale variations of the test plate made of the material ZERODUR®. With the novel advanced push rod dilatometer, the very good homogeneity measurement results can be confirmed. Both sample sets with a total number of 36 samples are within a peak-to-valley variation of 2 ppb/K CTE homogeneity of the material ZERODUR®.

Figure 11:
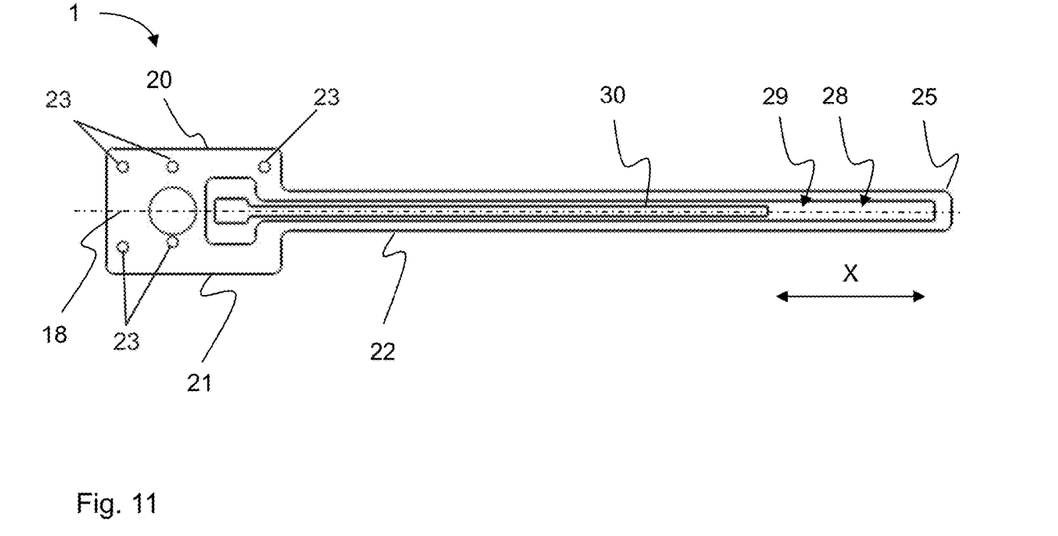
FIG. 11 is a schematic view of a push rod dilatometer.

Finally, FIG. 11 schematically illustrates a measuring device for measuring the linear dimension of a sample in a predetermined temperature range on the basis of the advanced push rod dilatometer 1. Push rod dilatometer 1 comprises an elongated fork 20 and a likewise elongated push rod 30. For the sake of clarity, the springs for holding the push rod in the fork are not indicated in this view.

Fork 20 comprises a measuring portion 21 which is preferably adapted to be connected to the measuring device or measuring apparatus, in particular the distance sensor, preferably to the linear incremental encoder (not shown), an elongated tapering central portion 22 including two symmetrical legs arranged in parallel to each in a fork-like manner, and a sample receiving area 25 opposite to measuring portion 21. Reference numeral 18 indicates the zero line of the fork 20.

Fork 20 defines a hollow elongated inner space 29 for receiving an elongated sample (not shown) and push rod 30. The sample is inserted into the designated sample receiving space 28 which comprises a portion of the elongated inner space 29 in the sample receiving area 25. Preferably, the symmetry axis of the sample lies on zero line 18.

Fork 20 is formed monolithically, so that connection points and joints are eliminated. Therefore, it is free of glue joints and other synthetic parts which might exhibit undesirably high thermal expansion.

The sample receiving area 25 of fork 20 is adapted to enable the sample to be subjected to a specific temperature, that means to be heated or cooled. For this purpose, the relevant area 25 of the receiving means may be introduced into a temperature control device such as a cooling chamber or a furnace (not shown).

The measuring portion 21 of fork 20 is adapted so as to allow for easy connection to the measuring apparatus. To this end, appropriate seats, recesses or bores 23 are provided, which allow for a high-precision positive connection of fork 20 to the measuring apparatus.

The elongated push rod 30 is arranged within fork 20 at the same spacing from the two legs and can be moved in longitudinal direction in the inner space while it is held by springs. The displacement occurs along the line of symmetry and in parallel to the measuring direction which is denoted by "X".

Like fork 20, the push rod 30 is also formed monolithically so that connection points and joints are eliminated. Glue joints and other synthetic parts are dispensed with, since they might exhibit undesirably high thermal expansion and might therefore adversely affect the inherent extension of the device.

Push rod 30 is held by springs (not shown) which are connected to portions of the legs on one side and to push rod 30 on the other for this purpose.

Push rod 30 is adapted to contact a sample introduced in the sample receiving space, at the desired temperature. For this purpose, the push rod may be equipped with a sensing stamp at its head end, which is adapted for engaging, in defined manner and with high-precision, at a sample inserted in the inner space. Engaging preferably occurs with very low pressure so as to not deform the loaded sample.

The invention claimed is:

1. A method for determining thermal expansion of a low thermal expansion material, comprising:
    taking a measurement of the thermal expansion of the low thermal expansion material with an accuracy of at most +/−3 ppb/K and with a reproducibility of at most +/−1 ppb/K, wherein the step of taking the measurement comprises:
    forming a positive connection between a measuring portion of a fork and a linear incremental encoder;
    inserting a sample of the low thermal expansion material in a measurement device between a head end of a push rod and an open area of the fork not covered by the push rod, wherein the fork and the push rod are monolithic;
    controlling a temperature of the sample, the head end, and the open area of the fork to a first temperature;
    controlling a humidity of a room in which the measurement device is placed to not more than +/−2% deviation of a predetermined humidity; and
    contacting, while controlling to the first temperature and the humidity, the sample with the push rod and measuring a first position of a foot end of the push rod relative to the fork, wherein the step of measuring the first position comprises determining the first position using the linear incremental encoder.

2. The method as claimed in claim 1, further comprising storing the first position in a processing unit.

3. The method as claimed in claim 2, further comprising controlling the sample, the head end, and the open area of the fork to a second temperature;
    contacting, once the second temperature is reached, the sample with the push rod and measuring a second position of the foot end of the push rod relative to the fork.

4. The method as claimed in claim 1, wherein the measurement accuracy is 1 ppb/K or less.

5. The method as claimed in claim 1, wherein the measurement accuracy is 0.6 ppb/K (2 Sigma, 95% confidence level) or less for CTE (0° C., 50° C.).

6. The method as claimed in claim 1, wherein the push rod and fork comprise a push rod dilatometer.

7. The method as claimed in claim 1, wherein the measurement accuracy is performed with the reproducibility of at most +/−5 ppb/K.

8. The method as claimed in claim 1, wherein the measurement accuracy is performed with the reproducibility of at most +/−1 ppb/K.

9. The method as claimed in claim 1, wherein the step of controlling the temperature comprises heating in a furnace using a heat transfer medium.

10. The method as claimed in claim 9, wherein the heat transfer medium is helium.

11. The method as claimed in claim 1, wherein the step of controlling the temperature comprises controlling the temperature to a selectable temperature range, the temperature range being selectable between −50 and +100° C.

12. The method as claimed in claim 1, wherein the sample is selected from the group consisting of ceramics, glass ceramics, and glasses, low thermal expansion fused silica, Ti-doped quartz glass, low thermal expansion LAS glass ceramics, Zerodur®, Clearceram®, SITAL®, low thermal expansion ceramic, and cordierite.

13. A device for carrying out the method of claim 1, comprising a push rod dilatometer comprising the push rod and the fork.

14. The device as claimed in claim 13, wherein the fork and the push rod are monolithically formed and/or connected without any organic compounds or plastic components.

15. The device as claimed in claim 13, further comprising a cryostat controlling a temperature to a range from −50° C. to +100° C. with a reproducibility of at least 0.5° C.

16. The device as claimed in claim 13, wherein the device is configured to have creeping of not more than 0.1 nm/h (1.4 nm/day).

17. The device as claimed in claim 13, wherein the linear incremental encoder has a measuring head that exhibits an absolute accuracy of at least +/−10 ppb/K and/or the reproducibility of not more than +/−2 ppb/K.

18. The method according to claim 1, wherein the room is a laboratory environment.

19. The method according to claim 1, wherein the step of forming the positive connection comprises providing one or more seats, recesses, or bores in the measuring portion of the fork.

20. A method for determining thermal expansion of a low thermal expansion material, comprising:
providing a dilatometer having a monolithic fork and a monolithic push rod;
forming a positive connection between a measuring portion of a fork and a linear incremental encoder;
inserting a sample of the low thermal expansion material between the fork and the push rod;
controlling a temperature of the sample and the dilatometer to a first temperature;
controlling a humidity of a room in which the dilatometer is placed to not more than +/−2% deviation of a predetermined humidity; and
measuring, using the incremental linear encoder, while controlling to the first temperature and to the humidity, a first position of the push rod relative to the fork when contacting the sample with the push rod;
controlling the temperature of the sample and the push rod dilatometer to a second temperature;
measuring, using the incremental linear encoder, while controlling to the second temperature and to the humidity, a second position of the push rod relative to the fork when contacting the sample with the push rod; and
determining a thermal expansion of the low thermal expansion material from the first and second positions to an accuracy of at most +/−3 ppb/K and a reproducibility of at most +/−1 ppb/K.

21. The method as claimed in claim 20, wherein the accuracy is 1 ppb/K or less.

22. The method as claimed in claim 20, wherein the accuracy is 0.6 ppb/K (2 Sigma, 95% confidence level) or less for CTE (0° C., 50° C.).

23. The method according to claim 20, wherein the room is a laboratory environment.

24. A method for determining thermal expansion of a low thermal expansion material, comprising:
measuring thermal expansion of a reference sample with an interferometer having two lasers of different wavelengths and averaging length values measured by the two lasers to provide a reference thermal expansion;
remeasuring thermal expansion of the reference sample, wherein the remeasuring comprises:
(i) inserting the reference sample in a measurement device between a head end of a push rod and an open area of a fork not covered by the push rod, wherein the fork and the push rod are monolithic,
(ii) controlling a temperature of the reference sample, the head end, and the open area of the fork to a first temperature, and
(iii) contacting, while controlling to the first temperature, the sample with the push rod and determining a first position of a foot end of the push rod relative to the fork using a linear incremental encoder to provide a remeasured reference thermal expansion;
determining an inherent thermal expansion of the measurement device from the reference thermal expansion and the remeasured reference thermal expansion;
measuring thermal expansion of the low thermal expansion material, wherein the measuring of the low thermal expansion material comprises:
(i) inserting a sample of the low thermal expansion material in the measurement device between the head end and the open area,
(ii) controlling the temperature of the sample, the head end, and the open area of the fork to the first temperature, and
(iii) contacting, while controlling to the first temperature, the sample with the push rod and determining the first position to provide a sample thermal expansion;
correcting the sample thermal expansion by the inherent thermal expansion of the measurement device; and
measuring a creeping behavior of the inherent thermal expansion of the measurement device over a time period and checking if measurement repeatability varies with temperature.

25. The method according to claim 24, wherein the interferometer has three lasers of different wavelengths and wherein the step of measuring the thermal expansion of the reference sample comprises averaging length values measured by the three lasers to provide the reference thermal expansion.

26. The method according to claim 24, wherein the two lasers comprise a J2-stabilized laser at 532 nm and a J2-stabilized laser at 633 nm.

27. A method for determining thermal expansion of a low thermal expansion material, comprising:
taking a measurement of the thermal expansion of the low thermal expansion material, wherein the step of taking the measurement comprises:
inserting a sample of the low thermal expansion material in a measurement device between a head end of a push rod and an open area of a fork not covered by the push rod, wherein the fork and the push rod are monolithic; and
contacting the sample with the push rod and measuring a first position of a foot end of the push rod relative to the fork, wherein the step of measuring the first position comprises determining the first position using a linear incremental encoder, wherein a measuring portion of the fork is adapted so as to allow for a high-precision positive connection of the fork and the linear incremental encoder.

28. The method as claimed in claim 27, wherein the step of taking a measurement is performed with an accuracy of at most +/−3 ppb/K and with a reproducibility of at most +/−1 ppb/K.

29. The method as claimed in claim 27, further comprising controlling a temperature of the sample, the head end, and the open area of the fork to a first temperature.

30. The method as claimed in claim 27, further comprising controlling a humidity of a room in which the measurement device is placed to not more than +/−2% deviation of a predetermined humidity.

31. The method as claimed in claim 27, wherein the step of contacting is performed by controlling to the first temperature and the humidity.

32. The method as claimed in claim 27, further comprising storing the first position in a processing unit.

33. The method as claimed in claim 32, further comprising
controlling the sample, the head end, and the open area of the fork to a second temperature;
contacting, once the second temperature is reached, the sample with the push rod and measuring a second position of the foot end of the push rod relative to the fork.

34. The method as claimed in claim 27, wherein the measurement accuracy is 1 ppb/K or less.

35. The method as claimed in claim 27, wherein the measurement accuracy is 0.6 ppb/K (2 Sigma, 95% confidence level) or less for CTE (0° C., 50° C.).

36. The method as claimed in claim 27, wherein the push rod and fork comprise a push rod dilatometer.

37. The method as claimed in claim 27, wherein the step of controlling the temperature comprises heating in a furnace using a heat transfer medium.

38. The method as claimed in claim 37, wherein the heat transfer medium is helium.

39. The method as claimed in claim 27, wherein the step of controlling the temperature comprises controlling the temperature to a selectable temperature range, the temperature range being selectable between −50 and +100° C.

40. The method as claimed in claim 27, wherein the sample is selected from the group consisting of ceramics, glass ceramics, and glasses, low thermal expansion fused silica, Ti-doped quartz glass, low thermal expansion LAS glass ceramics, Zerodur®, Clearceram®, SITAL®, low thermal expansion ceramic, and cordierite.

41. A device for carrying out the method of claim 27, comprising a push rod dilatometer comprising the push rod and the fork.

42. The device as claimed in claim 41, wherein the fork and the push rod are monolithically formed and/or connected without any organic compounds or plastic components.

43. The device as claimed in claim 41, further comprising a cryostat controlling a temperature to a range from −50° C. to +100° C. with a reproducibility of at least 0.5° C.

44. The device as claimed in claim 41, wherein the device is configured to have creeping of not more than 0.1 nm/h (1.4 nm/day).

45. The device as claimed in claim 41, wherein the linear incremental encoder has a measuring head that exhibits an absolute accuracy of at least +/−10 ppb/K and/or the reproducibility of not more than +/−2 ppb/K.

* * * * *